United States Patent
Bähr et al.

(10) Patent No.: US 6,233,917 B1
(45) Date of Patent: May 22, 2001

(54) METHOD OF CONTROLLING THE TEMPERATURE OF INTAKE AIR, TEMPERATURE-CONTROL DEVICE FOR CARRYING OUT THE METHOD AND GAS TURBINE HAVING THE TEMPERATURE-CONTROL DEVICE

(75) Inventors: Siegfried Bähr, Eggolsheim; Thomas Pfuff, Rückersdorf, both of (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/288,752

(22) Filed: Apr. 8, 1999

Related U.S. Application Data

(63) Continuation of application No. PCT/DE97/02188, filed on Sep. 25, 1997.

(30) Foreign Application Priority Data

Oct. 8, 1996 (DE) ................................................ 196 41 434

(51) Int. Cl.[7] ............................... B01F 3/02; G05D 21/00
(52) U.S. Cl. ........................... 60/39.093; 62/82; 165/230; 236/44 C; 454/121
(58) Field of Search ........................... 62/93, 229, 176.5, 62/82; 236/44 C, 44 A; 454/121, 75; 165/230; 60/39.093

(56) References Cited

U.S. PATENT DOCUMENTS

| 3,210,058 | 10/1965 | Colvin | 261/128 |
|---|---|---|---|
| 3,584,785 | 6/1971 | Matulich | 236/80 X |
| 4,328,666 * | 5/1982 | Cummins, Jr. | 60/39.093 |
| 4,360,882 | 11/1982 | Stewart et al. | 415/15 X |
| 4,747,748 | 5/1988 | Sahlberg | 415/47 |

FOREIGN PATENT DOCUMENTS

| 26 19 600 | 11/1977 | (DE) . |  |
|---|---|---|---|
| 34 36 273 A1 | 4/1985 | (DE) . |  |
| 39 03 234 A1 | 8/1990 | (DE) . |  |
| 405296531 * | 11/1993 | (JP) | 236/44 C |

OTHER PUBLICATIONS

Patent Abstracts of Japan No. 52–66239 (Takihana), dated Aug. 1, 1979.
"Freezing in gas turbine compressors and measures for trouble–free operation", Brown–Boveri Technology, vol. 4, 1985, pp. 172–177.
"Freezing in gas turbine compressors and effects on operation" (Romeyke et al.), VGB Power Engineering 62, vol. 7, Jul. 1982, pp. 552–560.

* cited by examiner

Primary Examiner—William Wayner
(74) Attorney, Agent, or Firm—Herbert L. Lerner; Laurence A. Greenberg; Werner H. Stemer

(57) ABSTRACT

A method of controlling the temperature of intake air provided from outside air passing through an air-feed system only utilizes an especially low heating of the intake air while at the same time safely avoiding the formation of ice in the intake air, in order to avoid efficiency losses. A temperature setpoint formed by the sum of the dew point of the outside air and an additive margin of safety is preselected for the intake air. A temperature setpoint of not more than the sum of 0° C. and the margin of safety is advantageously preselected. A temperature-control device for carrying out the method and a gas turbine having the temperature-control device are also provided.

21 Claims, 1 Drawing Sheet

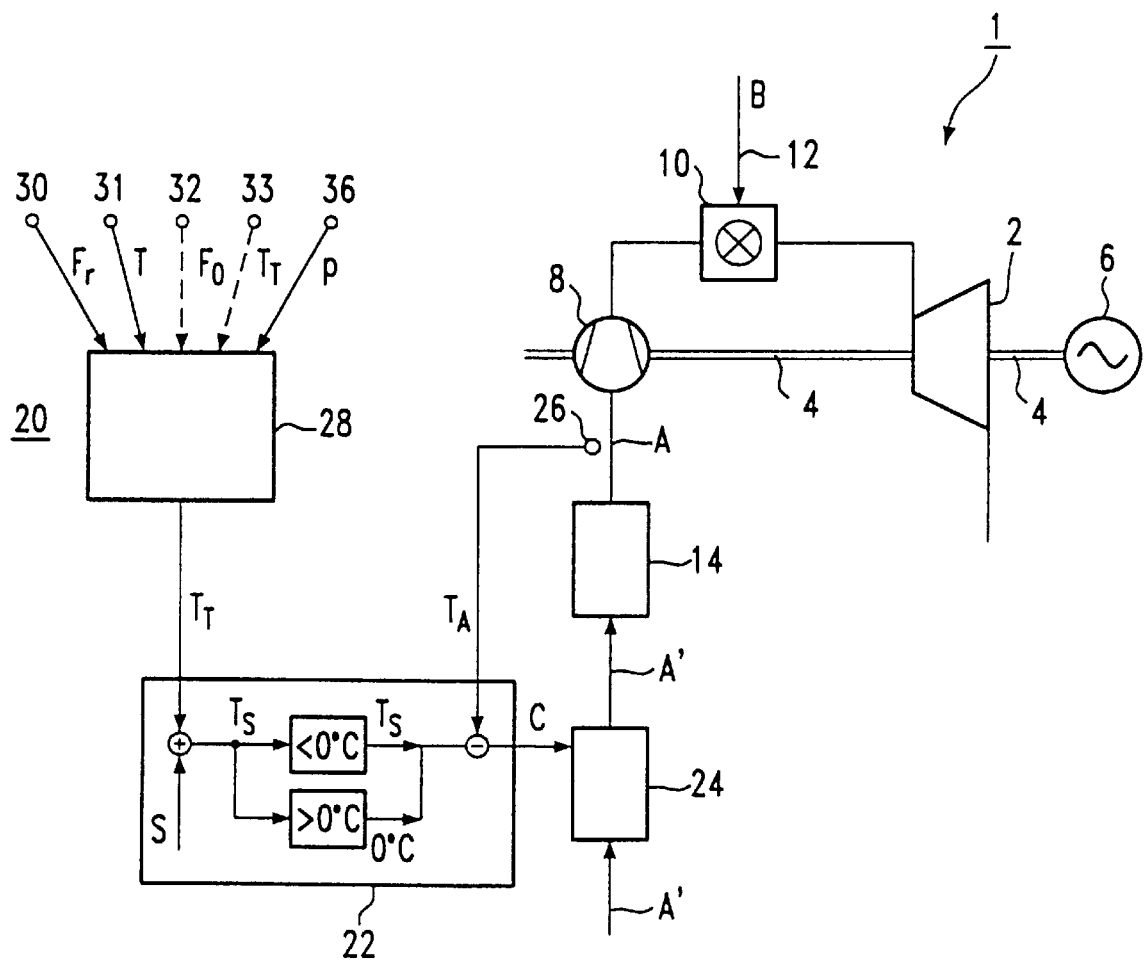

METHOD OF CONTROLLING THE TEMPERATURE OF INTAKE AIR, TEMPERATURE-CONTROL DEVICE FOR CARRYING OUT THE METHOD AND GAS TURBINE HAVING THE TEMPERATURE-CONTROL DEVICE

CROSS-REFERENCE TO RELATED APPLICATION

This application is a continuation of copending International Application No. PCT/DE97/02188, filed Sep. 25, 1997, which designated the United States.

BACKGROUND OF THE INVENTION

1. Field of the Invention

The invention relates to a method of controlling the temperature of intake air which is provided from outside air through an air-feed system. The invention also relates to a temperature-control device for carrying out the method and a gas turbine having the temperature-control device.

In many plants, in particular in internal-combustion engines or compressors, an air feed may be necessary for operation. To that end, an air-feed system which provides intake air obtained from outside air is normally provided. Such an air-feed system may include, for example, a number of intake elements as well as filter elements.

In a gas turbine as well, it is necessary to feed intake air to a compressor which is connected upstream of a combustion chamber. To that end, such an air-feed system is normally likewise connected upstream of the compressor. The air drawn in by the air-feed system is generally accelerated when flowing through the air-feed system. In the process, that acceleration may be effected locally on one hand while flowing around or through an obstacle, for example a bird protection grille or a filter. On the other hand, however, an approximately adiabatic acceleration of the drawn-in air also results from a constriction of the cross section of flow along the throughflow path in the air-feed system. That adiabatic acceleration of the drawn-in air is associated with an enthalpy reduction. The enthalpy reduction in turn produces a temperature drop in the drawn-in air. It is established mathematically, for example, that the drawn-in air cools down by about 5° C. during an acceleration of the drawn-in air to a velocity of about 100 m/s, which is normally present at the inlet of the compressor of the gas turbine. Ice may form in the process depending on the state of the outside air, in particular its pressure and temperature. That formation of ice may lead to a reduction in output of the gas turbine, to breakdowns, or even to damage to the gas turbine and is therefore to be avoided.

In order to avoid the formation of ice in the intake air provided by the air-feed system of the gas turbine, it is normal practice to warm up the intake air before it enters the compressor of the gas turbine or at the inlet of the air-feed system. In that case, conventional heating systems or anti-icing systems are used. In such a heating system, the intake air may be heated up by various methods such as, for example, by feeding recirculated hot compressor air, by using a steam-heated heat exchanger or even by using electric heating. Similar systems for preventing the formation of ice in the intake air provided by an air-feed system may also be used in other plants, such as, for example, in internal-combustion engines or compressors.

However, the use of a heating system results in a consumption of thermal energy, which is then no longer available to the gas turbine or the plant. Thus the efficiency of the gas turbine or the plant is reduced by the use of such a heating system.

SUMMARY OF THE INVENTION

It is accordingly an object of the invention to provide a method of controlling the temperature of intake air provided from outside air through an air-feed system, a temperature-control device for carrying out the method and a gas turbine having the temperature-control device, which overcome the herein afore-mentioned disadvantages of the heretofore-known methods and devices of this general type and with which a formation of ice in the intake air is safely and reliably avoided at an especially low consumption of energy.

With the foregoing and other objects in view there is provided, in accordance with the invention, a method of controlling the temperature of intake air provided from outside air passing through an air-feed system, which comprises forming a temperature setpoint from a sum of the dew point of the outside air and an additive margin of safety, and preselecting the temperature setpoint for the intake air. In this case, the temperature of the intake air is matched to the setpoint, for example by heating the intake air.

In this case, the "dew point" of a mixture of water vapor and air at a preselected pressure is defined as that temperature below which precipitation of water or ice starts as a result of condensation or desublimation.

The invention is based on the concept that the thermal energy to be provided in order to avoid the formation of ice can be kept especially low by preselecting an especially low temperature setpoint for the heating of the intake air. In this case, an especially low temperature setpoint, which in addition eliminates the formation of ice in the intake air in a safe and reliable manner, is determined essentially by the dew point, since the formation of ice cannot take place for physical reasons if the dew point is exceeded by the temperature of the intake air.

In accordance with another mode of the invention, the sum of 0° C. and the margin of safety is preselected as the temperature setpoint when the dew point is greater than 0° C. This is done so that the quantity of heat required for preventing the formation of ice and to be provided for heating up the intake air, is kept especially low. This is based on the knowledge that a second physical boundary condition is also necessary for the formation of ice, namely that the temperature of the intake air must be below 0° C. for the formation of ice irrespective of the dew point of the intake air. Therefore, at a temperature of the intake air of more than 0° C., heating is not required in order to safely avoid the formation of ice.

In order to safely avoid the formation of ice, the temperature setpoint is oriented toward the dew point of the outside air and it exceeds the latter by the preset additive margin of safety. In accordance with a further mode of the invention, the formation of ice is reliably avoided when a margin of safety of at least 0° C. and at most 0.5° C. is selected.

The outside-air dew point, which is used as a basis when forming the temperature setpoint, may be determined in various ways. In accordance with an added mode of the invention, the dew point is determined or measured directly.

In accordance with an additional mode of the invention, however, the dew point may also be determined with the aid of the absolute humidity of the outside air or else with the aid of the temperature and the relative humidity of the outside air in an alternative expedient manner.

In accordance with yet another mode of the invention, a characteristics field is used as a basis for determining the dew point, and this characteristics field represents the physical connection between the dew point and the respective parameters used as a basis.

In accordance with yet a further mode of the invention, no control action is performed with respect to the intake air when the temperature of the outside air is less than −5° C. or more than 5° C. or when the relative humidity of the outside air is less than 80%. This is based on the knowledge that, as a physical boundary condition for the formation of ice in the intake air, the outside air must have a temperature of at least −5° C. and at most 5° C. and a relative humidity of at least 80%.

The dew point of the outside air depends on its pressure. In accordance with yet an added mode of the invention, the air pressure of the outside air is additionally determined and is used as an additional basis when determining the dew point. This mode is especially reliable even in the event of air-pressure fluctuations of the outside air. This may be effected, for example, with the aid of a characteristics field provided for this purpose. At the same time, the effect of the geodetic height on the air pressure of the outside air may also be taken into account.

With the objects of the invention in view there is also provided a temperature-control device for intake air provided from outside air passing through an air-feed system, the temperature-control device comprising a measuring system for determining the dew point of outside air; and a controller connected to the measuring system for receiving the dew point of the outside air, the controller forming a temperature setpoint from a sum of the dew point of the outside air and an additive margin of safety, and the controller setting a temperature of intake air using the temperature setpoint.

The output side of the controller acts on the heating system provided for heating up the outside air. This heating system may be connected upstream of the compressor of the gas turbine or upstream of the air-feed system.

In accordance with another feature of the invention, the controller receives a temperature setpoint of 0° C. for a sum of the dew point and the margin of safety of more than 0° C.

In accordance with a further feature of the invention, the margin of safety is expediently at least 0° C. and at most 0.5° C.

In accordance with an added feature of the invention, a sensor for directly determining the dew point of the outside air is connected to the input side of the measuring system.

In accordance with an additional feature of the invention, alternatively, a humidity sensor for determining the absolute humidity of the outside air is connected to the input side of the measuring system.

In accordance with yet another feature of the invention, alternatively, a temperature sensor for determining the temperature of the outside air and a humidity sensor for determining the relative humidity of the outside air are connected to the input side of the measuring system.

In accordance with a further feature of the invention, a characteristics field for determining the dew point of the outside air is stored in the measuring system.

In accordance with an added feature of the invention, the controller performs no control action with respect to the intake air at a temperature of the outside air of less than −5° C. or more than 5° C. or at a relative humidity of the outside air of less than 80%.

In accordance with an additional feature of the invention, a pressure sensor for determining the air pressure of the outside air is connected to the input side of the measuring system.

With the objects of the invention in view, there is additionally provided a gas-turbine plant, comprising a temperature-control device associated with the air-inlet side of a compressor connected upstream of a combustion chamber of the gas turbine.

Other features which are considered as characteristic for the invention are set forth in the appended claims.

Although the invention is illustrated and described herein as embodied in a method of controlling the temperature of intake air, a temperature-control device for carrying out the method and a gas turbine having the temperature-control device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWINGS

The FIGURE of the drawing is a schematic circuit diagram of a gas-turbine plant having a temperature-control device.

DESCRIPTION OF THE PREFERRED EMBODIMENTS

Referring now in detail to the single FIGURE of the drawing, there is seen a gas turbine 1 that includes a turbine part 2 having a turbine shaft 4 on which a generator 6 is disposed on one side and a compressor 8 is disposed on the other side. The compressor 8 is connected on the outlet side to a combustion chamber 10, which in turn is connected on the outlet side to the turbine part 2. A fuel B, such as gas, is fed to the combustion chamber 10 through a feed system 12, during operation.

An air-feed system 14 is connected upstream of the compressor 8 in order to feed intake air A. During operation, outside air A' from the ambient surroundings of the gas turbine 1 is admitted to the air-feed system 14 on the inlet side. The air-feed system 14 is a pipeline system or duct system (which is not shown in any greater detail) having a number of intake elements and filter devices. A number of sound-absorbing elements may also be disposed in the air-feed system 14 in a non-illustrated manner.

The outside air A' is accelerated when flowing through the air-feed system 14 before it passes into the compressor 8 as intake air A. This acceleration is approximately adiabatic and is therefore associated with a temperature drop of the intake air A relative to the in flowing outer air A'. In order to also safely avoid the formation of ice in the intake air A and possible damage to the gas turbine 1 or the air-feed system 14 resulting therefrom in the event of unfavorable conditions for the outside air A', the gas-turbine 1 has a temperature-control device 20.

The temperature-control device 20 includes a controller 22, which is connected on the output side to a heating device 24 for the outside air A' flowing into the air-feed system 14. The heating device 24 is connected upstream of the air-feed system. On the input side, the controller 22 is connected to a temperature sensor 26 for measuring a temperature $T_A$ of the intake air A flowing to the compressor 8. In this case, the temperature sensor 26 is advantageously disposed between the outlet of the air-feed system 14 and the inlet of the compressor 8, since the adiabatic acceleration of the intake air A to be expected is at a maximum at this point.

Furthermore, the controller 22 is connected on the input side to a measuring system 28. The measuring system 28 is connected on the input side to a number of measuring sensors 30, 31 for determining parameters which are characteristic of the outside air A'. The measuring system 28 is intended for transmitting a measured value $T_T$, which is characteristic of the dew point of the outside temperature of the outside air A', to the controller 22. A pressure gage 36 is also preferably connected to the measuring system 28.

During operation of the gas turbine 1, the controller 22 forms a temperature setpoint $T_S$ according to an equation $T_S=T_T+S$, from the measured value $T_T$ transmitted from the measuring system 28 for the dew point of the intake air A and from a predeterminable margin of safety S. The controller 22 transmits a manipulated-variable value C for the heating system 24 as a function of the difference between this temperature setpoint $T_S$ and the temperature $T_A$ of the intake air A. In this case, the heating system 24, which is represented in the figure like a heat exchanger, may be of any construction. In particular, it may be a feeding system for hot compressor air which can be recirculated, a steam-heated heat exchanger or an electric heating device. An adapted manipulated-variable value C transmitted by the controller 22 is provided in this case depending on the type of heating system 24. For example, it may be a heating flow, a valve setting, as well as another suitable manipulated-variable value C.

The controller 22 heats the outside air A' flowing into the air-feed system 14, through the use of the heating system 24, until the temperature $T_A$ of the intake air coincides with the temperature setpoint $T_S$ preselected by the controller 22, within a preselectable tolerance.

In this case, the controller 22 preselects the sum of the dew point $T_T$ of the outside air A' and the preset margin of safety S as the temperature setpoint $T_S$, if the dew point $T_T$ is less than 0° C. If the dew point $T_T$ is greater than or equal to 0° C., the controller 22 instead presets a temperature setpoint $T_S$ which is formed from the sum of 0° C. and the margin of safety S. In this case, a value of at least 0° C. and at most 0.5° C. is provided as the margin of safety S.

In the process, the dew-point measured value $T_T$ transmitted from the measuring system 28 to the controller 22 is determined in the measuring system 28 with the aid of measured values which are delivered by the measuring sensors 30, 31 and which characterize the outside air A'. In the exemplary embodiment, a humidity sensor for determining the relative humidity $F_r$ of the outside air A' is provided as the first measuring sensor 30. In this case, the measured value for the relative humidity $F_r$ is likewise transmitted from the measuring system 28 to the controller 22. A temperature sensor for determining the temperature T of the outside air A' is provided as the second measuring sensor 31. Alternatively or in addition, however, a humidity sensor 32 for determining the absolute humidity $F_o$ of the outside air A' or a sensor 33 for directly determining the dew point $T_T$ Of the outside air A' may be provided.

Furthermore, on one hand the controller 22 is constructed in a non-illustrated manner in such a way that it only presets the temperature setpoint $T_S$ for the intake air A at a relative humidity $F_r$ of the outside air A' of more than 80%. On the other hand, at a relative humidity $F_r$ of the outside air A' of less than 80%, the controller 22 performs no control action with respect to the drawn-in outside air A'.

Likewise, on one hand the controller 22 is constructed in a non-illustrated manner in such a way that it only presets the temperature setpoint $T_S$ for the intake air A at a temperature T of the outside air A' of at least −5° C. and at most 5° C. On the other hand, at a temperature T of the outside air A' of less than −5° C. or more than 5° C., the controller 22 performs no control action with respect to the drawn-in outside air A'.

A characteristics field is stored in the measuring system 28 in order to determine the measured value $T_T$ for the dew point of the outside air A' from its temperature T and its relative humidity $F_r$. This characteristics field represents the physical connection between the dew point, the temperature and the relative humidity of air. Basic values for setting up such a characteristics field are given by way of example in the following table.

TABLE 1

| Realtive humidity of the outside air in % → ↓ Outside-air temperature in ° C. ↓ | Dew points in ° C. | | | Desired temperatures at compressor inlet in ° C. | | |
| --- | --- | --- | --- | --- | --- | --- |
| | 100 | 90 | 80 | 100 | 90 | 80 |
| +5 | +5 | +3.3 | +1.7 | 0 | 0 | 0 |
| +4 | +4 | +2.3 | +0.8 | 0 | 0 | 0 |
| +3 | +3 | +1.6 | 0 | 0 | 0 | 0 |
| +2 | +2 | +0.5 | −1 | 0 | 0 | −1 |
| +1 | +1 | −0.3 | −2.1 | 0 | −0.3 | −2.1 |
| 0 | 0 | −1.4 | −3 | 0 | −1.4 | −3 |
| −1 | −1 | −2.4 | −4 | −1 | −2.4 | −4 |
| −2 | −2 | −3.5 | −5 | −2 | −3.5 | −5 |
| −3 | −3 | −4.3 | −6 | −3 | −4.3 | −6 |
| −4 | −4 | −5.4 | −7 | −4 | −5.4 | −7 |
| −5 | −5 | −6.5 | −8 | −5 | −6.5 | −8 |

Interpolation is to be carried out in a suitable manner in order to obtain intermediate values between the basic values specified. Since the controller 22 is constructed in such a way that it performs no control action with respect to the drawn-in outside air A' at a relative humidity $F_r$ of the outside air A' of less than 80% or at a temperature T of the outside air A' of less than −5° C. or more than 5° C., the characteristics field is limited accordingly. The memory location required to store the characteristics field in the measuring system is therefore especially small.

In the case of the alternative measurement of the absolute humidity $F_o$ of the outside air A' through the use of the sensor 32, instead of its temperature T and its relative humidity $F_r$, the measured value $T_T$ for the dew point can be inferred directly through a single characteristic or through a mathematical function. In this case, a mathematical function or a characteristic is stored in the measuring system 28, instead of the characteristics field. In this case, provision is made for the controller 22 to perform no control action with respect to the drawn-in outside air A' at an absolute humidity of the outside air A' of less than about 2 g of water vapor per kg of air. This takes into account the empirical value that icing generally does not take place below this limit value, since the air is then too dry. At an absolute humidity of the outside air A' of more than about 3.8 g of water vapor per kg of air, provision is made for the controller 22 to set the temperature setpoint $T_S$ for the intake air A to the sum of 0° C. and the margin of safety S, since the dew point of the outside air A' is then above 0° C.

On one hand, in the case of the likewise alternative direct measurement of the dew point $T_T$ of the outside air A' through the use of the sensor 33, provision is made for the controller 22 to perform no control action with respect to the drawn-in outside air A' at a dew point of less than about −8° C. This again corresponds to the case in which icing of the intake air A cannot occur, since air in such a state is too dry for icing. On the other hand, at a measured dew point of more than 0° C., the controller 22 sets the desired temperature $T_S$ for the intake air A to the sum of 0° C. and the margin of safety S.

The pressure sensor 36 referred to above is connected to the measuring system 28 in order to compensate for pressure fluctuations of the outside air A'. The measured value $T_T$ for the dew point of the outside air A' is corrected if need be with the aid of the measured value for the pressure p of the outside air A', which pressure p is transmitted to the measuring system 28 by this pressure sensor 36, and with the aid of an additional characteristics field stored in the measuring system 28.

Due to the modes of operation of the temperature-control device 20 which are described above, formation of ice in the intake air A is safely and reliably avoided, and at the same time the quantity of heat which is required for this and is to be fed into the heating system 24 is especially small. Reliable and safe operation of the gas turbine 1 with only a small loss of efficiency is therefore ensured.

We claim:

1. In a method for controlling the temperature of intake air in an air-feed system, the improvement which comprises:

forming a temperature setpoint from a sum of the dew point of the outside air and an additive margin of safety, and preselecting the temperature setpoint for the intake air;

controlling the temperature of the intake air to the preselected temperature setpoint for the intake air.

2. The method according to claim 1, which comprises carrying out the step of forming the temperature setpoint from the sum of 0° C. and the margin of safety, if the dew point is more than 0° C.

3. The method according to claim 1, which comprises selecting the margin of safety to be at least 0° C. and at most 0.5° C.

4. The method according to claim 1, which comprises determining the dew point with the aid of the temperature of the outside air and with the aid of the relative humidity of the outside air.

5. The method according to claim 4, which comprises carrying out the step of preselecting the temperature setpoint at a relative humidity of the outside air of at least 80%, and performing no control action with respect to the intake air at a relative humidity of the outside air of less than 80%.

6. The method according to claim 4, which comprises carrying out the step of preselecting the temperature setpoint at a temperature of the outside air of at least −5° C. and at most 5° C., and performing no control action with respect to the intake air at a temperature of the outside air of less than −5° C. and at a temperature of the outside air of more than 5° C.

7. The method according to claim 1, which comprises determining the dew point with the aid of the absolute humidity of the outside air.

8. The method according to claim 1, which comprises determining the dew point with the aid of a characteristics field.

9. The method according to claim 1, which comprises directly determining the dew point of the outside air.

10. The method according to claim 1, which comprises additionally determining the air pressure of the outside air.

11. A temperature-control device for air in an air-feed system, the temperature-control device comprising:

a measuring system for determining the dew point of outside air; and a controller connected to said measuring system for receiving the dew point of the outside air, said controller forming a temperature setpoint from a sum of the dew point of the outside air and an additive margin of safety, and said controller setting a temperature of intake air using the temperature setpoint.

12. The temperature-control device according to claim 11, wherein said controller forms the temperature setpoint from the sum of 0° C. and the margin of safety, at a dew point of more than 0° C.

13. The temperature-control device according to claim 11, wherein the margin of safety is at least 0° C. and at most 0.5° C.

14. The temperature-control device (20) according to claim 11, wherein said measuring system has inputs, and a temperature sensor for determining the temperature of the outside air and a humidity sensor for determining the relative humidity of the outside air are connected to said inputs.

15. The temperature-control device according to claim 14, wherein said controller forms the temperature setpoint at a relative humidity of the outside air of at least 80%, and said controller performs no control action with respect to the intake air at a relative humidity of the outside air of less than 80%.

16. The temperature-control device according to claim 14, wherein said controller forms the temperature setpoint at a temperature of the outside air of at least −5° C. and at most 5° C., and said controller performs no control action with respect to the intake air at a temperature of the outside air of less than −5° C. and at a temperature of the outside air of more than 5° C.

17. The temperature-control device according to claim 11, wherein said measuring system has an input, and a humidity sensor for determining the absolute humidity of the outside air is connected to said input.

18. The temperature-control device according to claim 11, wherein a characteristics field for determining the dew point of the outside air is stored in said measuring system.

19. The temperature-control device according to claim 11, wherein said measuring system has an input, and a sensor for directly determining the dew point of the outside air is connected to said input.

20. The temperature-control device according to claim 11, wherein said measuring system has an input, and a pressure sensor for determining the air pressure of the outside air is connected to said input.

21. A gas turbine, comprising:

a combustion chamber; and a compressor connected upstream of said combustion chamber and receiving intake air;

said temperature-control device according to claim 11 controlling the intake air.

* * * * *